June 30, 1925.                                                    1,544,508
G. VON ARCO
ARRANGEMENT FOR GENERATING HIGH FREQUENCY ENERGY
Filed Aug. 3, 1922
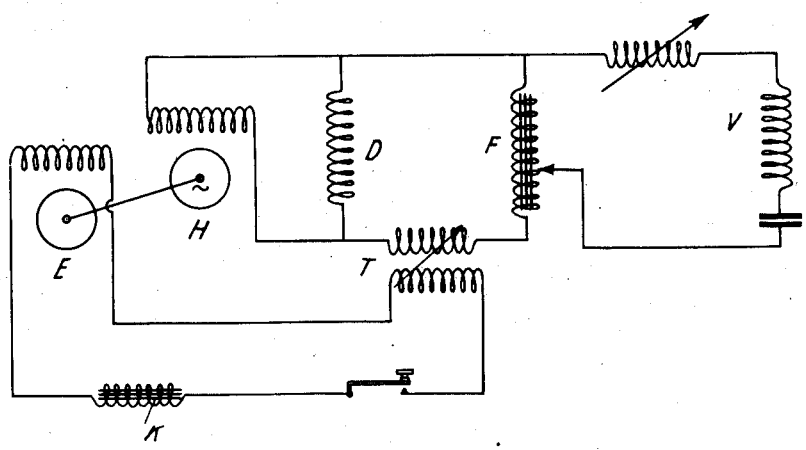
Inventor
GEORG. VON ARCO
By his Attorney Ira/Adams Patented June 30, 1925.

1,544,508

UNITED STATES PATENT OFFICE.

GEORG VON ARCO, OF BERLIN, GERMANY, ASSIGNOR TO GESELLSCHAFT FÜR DRAHT-LOSE TELEGRAPHIE M. B. H., HALLESCHES, OF BERLIN, GERMANY, A CORPORATION.

ARRANGEMENT FOR GENERATING HIGH-FREQUENCY ENERGY.

Application filed August 3, 1922. Serial No. 579,501.

*To all whom it may concern:*

Be it known that I, GEORG VON ARCO, a citizen of the Republic of Germany, and a resident of Hallesches Ufer 12/13, Berlin S. W. 11, Germany, have invented new and useful Improvements in Arrangements for Generating High-Frequency Energy, of which the following is a specification, accompanied by drawings.

Heretofore, in all high frequency machines which supply one or a plurality of frequency transformers, condensers were used for the purpose of keeping the power factor of the machines close to unity, thereby reducing the machine losses to a minimum. The smaller the fundamental frequency of the machine, the larger and more expensive was the condenser necessary for producing unity power factor.

The invention makes possible an arrangement in which strong magnetizing currents are supplied to the frequency transformer, and the expensive condensers are eliminated without materially reducing the working power factor of the machine. For the purpose of obtaining a large output, the magnetizing current of the frequency transformer must be made as strong as possible, because the magnetic energy stored during each half wave of the machine is utilized in the oscillating output circuit of the transformer arrangement. The oscillating circuit is tuned to the desired frequency, which is a harmonic of the fundamental frequency.

The invention is based on the principle of the synchronous motor which is connected in parallel to an alternating current machine and is over-excited while running. As is well known, such an arrangement is a means for regulating within wide limits, depending on the excitation of the field circuit, the power factor of a circuit. The difficulties arising from the necessity of providing a second large machine and from the tedious starting of such machine are eliminated by the present invention.

In accordance with the present invention, instead of a synchronous motor, a second generator of the same frequency as the main generator is used. However, the second generator is of smaller dimensions than the main generator, is mechanically coupled with the main generator and its voltage is displaced in phase by 90° with respect to the voltage of the main generator. By mechanical means this phase position may be varied by small amounts for the purpose of enabling adjustment in accordance with the different amounts of lead of the current with respect to the electromotive force. The two machines cooperate in such a manner that, generally speaking, the main generator supplies only the energizing component of the current which is delivered to the transformer, whereas the smaller synchronous generator supplies the component of the current necessary for magnetizing the iron core of the transformer.

The drawing is a diagrammatic representation of a circuit arrangement embodying the invention.

In the illustrated arrangement, H is the main generator and E the auxiliary generator, the rotating elements being mechanically connected so that they are driven together. As stated, the voltage generated by the auxiliary generator may lead the voltage of the main generator.

The main generator H is coupled to the frequency transformer F by means of choke coil D. Auxiliary generator E is coupled to the frequency transformer F by means of variable coupling T by means of which the voltage impressed on the transformer F by the generator E can be varied, thereby varying the phase relation of the current and voltage of the main generator H. The output circuit of auxiliary generator E has the choke coil K for aiding the proper relation of the voltage impressed on the input circuit of transformer F by the generator E. A switch S may also be included for opening the circuit when desired.

The coil D is so arranged and the coupling of coupling T so that the phase angle between the voltage of generator H and the current is near zero while the phase angle between the vector sum of the voltages of the main auxiliary generators and the current is comparatively large.

The output of the frequency transformer F is connected to circuit V which is tuned to the particular harmonic desired. Any even or odd multiple may be derived from the non-sinusoidal counter E. M. F. set up by the highly saturated frequency transformer F in a manner well known in the art and which it is not necessary to an understanding of my invention to describe here.

My theory of the operation of the invention is as follows. The input circuit of the frequency transformer F has two voltages impressed on it, $V_1$, the voltage of the main generator and $V_2$ the voltage induced by means of coupling T from the auxiliary generator E. Voltage $V_2$ is made to lead $V_1$. The resultant voltage $V$, obtained by adding vectorially voltages $V_1$ and $V_2$ must also lead the main voltage $V$. The phase angle between the voltage $V$ and the total current $I$ flowing thru the input circuit of transformer F will generally be lagging and will depend on, among other things, the amount of magnetizing current and the phase and amount of the load component of current $I$.

Assuming that the load component is practically in phase with the applied voltage $V$, the total current $I$ will lag the voltage $V$ an appreciable amount on account of the amount of the magnetizing current. However, if the voltage $V_2$ is large enough the total current $I$ will be in phase with or actually lead the voltage $V_1$. The above theory is not to be construed in a limiting sense, but is inserted merely to better explain the operation of the invention.

Having described my invention, what I claim is:

1. An arrangement for generating high frequency energy, comprising a first generator, an output circuit coupled to said first generator, a transformer requiring a high magnetizing current in said output circuit, a second generator, adjustable means connecting said generators together so that the phase relation of their generated voltages may be varied from 90°, and means for coupling said second generator to said output circuit to improve the power factor in said first generator.

2. An arrangement for generating high frequency energy comprising, a first generator, an output circuit coupled to said first generator, a load requiring a high magnetizing current in said output circuit, a second generator, adjustable means connecting said generators together so that the phase relation of their generated voltages may be varied from 90°, and adjustable means for coupling said second generator to said output circuit to improve the power factor in said first generator.

3. An arrangement for generating high frequency energy comprising, a first source of alternating voltage, an output circuit, a reactance coil for coupling said output circuit to said first source, a load requiring a high magnetizing current in said output circuit, a second source of alternating voltage having a phase displacement of substantially 90° with respect to the voltage of said first source, and means for coupling said second source to said output circuit to improve the power factor in said first source.

4. An arrangement for generating high frequency energy comprising, a first source of alternating voltage, an output circuit coupled to said first source, a load requiring a high magnetizing current in said output circuit, a second source of alternating voltage having a phase displacement of substantially 90° with respect to the voltage of said first source, and variable coupling means for coupling said second source to said output circuit to improve the power factor in said first source.

5. An arrangement for generating high frequency energy comprising an alternating current main generator, a transformer in the output circuit of the main generator, a choke coil for coupling said output circuit to said main generator, a second generator of the same frequency as the main generator and of smaller dimensions than the main generator, said second generator having a voltage phase displacement of substantially 90° with respect to the voltage generated by said main generator, means for mechanically connecting the second generator with the main generator for operation simultaneously therewith and a coupling between the output circuit of the second generator and the output circuit of the main generator for improving the power factor in said main generator.

GRAF GEORG van ARCO.